PRODUCTION OF ELECTROMAGNETIC ENERGY

Filed Jan. 28, 1958 2 Sheets-Sheet 1

INVENTOR

CHARLES H. TOWNES

BY Harold T. Stowell

ATTORNEY

INVENTOR
CHARLES H. TOWNES
BY Harold T. Stowell
ATTORNEY

United States Patent Office 2,879,439

Patented Mar. 24, 1959

2,879,439

PRODUCTION OF ELECTROMAGNETIC ENERGY

Charles H. Townes, New York, N.Y.

Application January 28, 1958, Serial No. 717,290

10 Claims. (Cl. 315—5)

This invention relates to apparatus for amplifying and producing electromagnetic energy directly from excited molecules or atoms, and has for its primary object the provision of means for obtaining electromagnetic energy which is generated directly by the change of state of molecules or atoms from a higher or excited state to a lower or unexcited state. Another major object is the provision of a sustained microwave amplifier using directly the energy of molecular or atomic excitation.

In a system of oscillator elements such as molecules, atoms, nuclei or electrons, which is normally in an equilibrium state due to exchange of energy between a population of oscillators in a higher state of energy, $E_2$, and a population in a lower state of energy, $E_1$, there will be a definite relationship between the number of oscillators (molecules, atoms, nuclei, electrons, or aggregates of such particles) in the two states, which may be expressed by:

$$N_2=N_1e^{-\left(\frac{E_2-E_1}{kT}\right)}$$

where $N_2$=population in the higher state
$N_1$=population in the lower state
$T$=temperature
$k$=Boltzmann's constant Furthermore, the individual oscillators will have random phases with respect to each other.

These conditions may be described in quantum mechanical rotation by letting a wave-function $\psi_1$ correspond to a single, non-degenerate, lower state and $\psi_2$ to a single, non-degenerate, upper state. Then the $n$th oscillator element may be described by the linear combination $$\psi_n=a_n\psi_1+b_n\psi_2 \text{ where } a_n|^2+|b_n|^2=1$$

For thermodynamic equilibrium of a large number of elements, $$\underset{n}{\epsilon}|a_n|^2=\underset{n}{\epsilon}|b_n|^2e\frac{-(E_2-E_1)}{kT}$$

and $$\frac{\underset{n}{\epsilon a_n b_n}}{\underset{n}{\epsilon}|a_n b_n|}=0$$

It is well known that the radiation intensity produced by such a system of elements at thermodynamic equilibrium is limited by the intensity of radiation from a black body at the same temperature, which in the region of microwave and radio frequencies corresponds to a very low and not very useful intensity. This invention shows how an ensemble of oscillator elements may be put into a condition which does not correspond to thermodynamic equilibrium at any temperature, and how such ensemble may provide useful amounts of radiation or amplify such radiation. Systems of this type are normally unstable, because of their failure to satisfy the conditions of thermodynamic equilibrium, and may be allowed to decay to a more stable condition with release of useful electromagnetic radiation of frequencies which depend on the difference in energy between the higher and lower states postuated above.

For example, if by a process of selection we can remove a higher proportion of oscillators in the lower energy state than is required to maintain equilibrium, leaving a number of oscillators in the upper state greater than the number which would correspond to equilibrium, the transitions downward which are permitted by the selection rules in order to restore equilibrium will produce radiation at varying frequencies.

It can be stated as a general principle, that if a system of molecules, atoms, nuclei or electrons is put into a state corresponding to a "negative temperature," i.e., where the upper state or states are more populated proportionately than the lower, the system may spontaneously radiate or may radiate under stimulation to give power amplification.

According to the invention, a beam of gas molecules in such an excited state is supplied continuously to a high Q resonant cavity. Transitions are induced in the cavity, resulting in a change in cavity power level when the beam of molecules is present. If the power from the beam is enough to maintain the field strength in the cavity at a sufficiently high level to induce transitions in the following beam molecules, then self-sustained oscillations will result. Although the power so produced is at a very low level, it should be noted that it is produced directly and entirely by molecular activity, and it has been demonstrated that it can be maintained at an extraordinary frequency stability in the order of 1 part in $10^{10}$ or better, so that a clock monitored by such an oscillator will vary no more than one second in 300 years.

The required beam of excited molecules may be produced by forcing a stream of a suitable gas, e.g., ammonia, under slight pressure into one end of a sealed and evacuated chamber. As the beam or stream of ammonia molecules enters, it is subjected to an electrostatic field produced by a system of focusing electrodes arranged to separate the beam of molecules into two portions. In one portion molecules in high-energy states predominate, in the other those in low-energy states. These latter molecules are diverted from the beam while the high-energy ones are directed into a high Q resonant cavity. Here some of the molecules undergo transitions, giving up energy in the process. These in turn trigger other ammonia molecules, causing them to radiate their energy as well. Since the excited molecules in the cavity are continually being renewed by the beam, enough excited molecules can be provided to start a self-sustaining chain reaction, producing oscillations inside the cavity, and microwaves are continuously emitted from the cavity. If fewer molecules are present than are necessary to maintain oscillation, then by supplying a signal from an external radio-frequency oscillator of the same frequency, further oscillations of this frequency can be triggered in the same way by the signal, and thus the device will function in this case as an amplifier of microwave oscillations. By adjusting the flow of ammonia gas into the chamber, it is possible to determine which type of operation will be produced. The frequency will be essentially determined by the molecular resonant frequency, but may be varied by the Zeeman or the Stark effect, i.e., by applying a magnetic or an electric field. Some frequency variations may also be obtained by tuning the cavity. The radiation is essentially monochromatic since radiation from each transition is exactly in phase with the initial radiation.

The principles of the invention, as well as other objects and advantages thereof, will clearly appear from a description of a preferred embodiment as shown in the accompanying drawings, in which.

Figure 1:
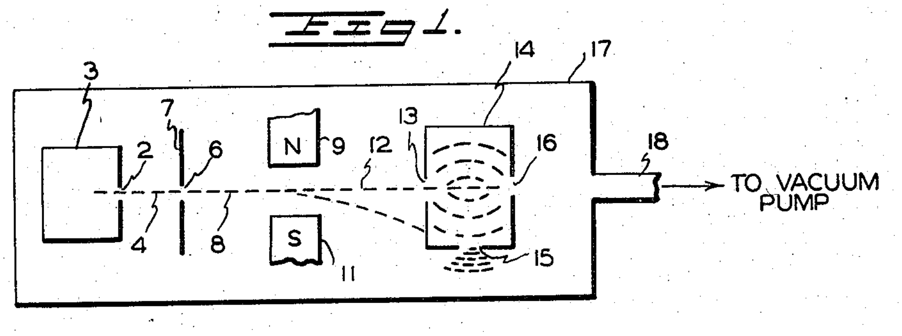
Fig. 1 is a schematic diagram showing the basic principle of the invention.

Fig. 1 shows in a highly schematic form the principle of the invention. Gas at room temperature or some other suitable temperature emerges under slight pressure from aperture 2 in container 3 to form a beam or stream 4. A small slit or aperture 6 in barrier 7 helps to define the stream so that a relatively narrow beam 8 of gas molecules passes between the poles 9 and 11 of a magnet. Some molecules in the gas normally exist in states with the energy difference $h\nu$. Molecules in these states are selectively deflected by the field as in molecular beam spectroscopy, so that a remanent beam 12 of molecules preponderately in a higher energy state may thus be directed into aperture 13 of a high Q cavity resonator 14. Molecules in still other states than those represented by the two beams may also exist, but are not of appreciable significance for the present purpose. The excited molecules which now preponderate in the cavity radiate slowly at first by "spontaneous" or thermally induced emission, but if the cavity has a high Q the random thermal field in the cavity will have been increased slightly thus making emission from subsequent entering molecules more probable, so that the field is gradually built up as more emissions are induced until almost all excited molecules entering the cavity make transitions and molecules emerge from the cavity through aperture 16 in a condition of substantial equilibrium as previously explained. The entire system is enclosed in a tight chamber 17 coupled at 18 to a vacuum pump so that the unwanted molecules are continually removed from the system. If the losses in the cavity are less than the power delivered by the transition of the excited molecules, oscillations will occur, although even if the power so produced is inadequate to sustain oscillations, an applied field of suitable frequency can still be amplified by the induced oscillations. An aperture 15 may be provided within the cavity for obtaining useful radiation, or any other known way of coupling an external electric circuit to the cavity may be employed for either inserting signals or withdrawing microwave power. It will be understood that instead of a magnetic field, an electric field may be used to deflect, or in some cases to focus, the beam.

Figure 2:
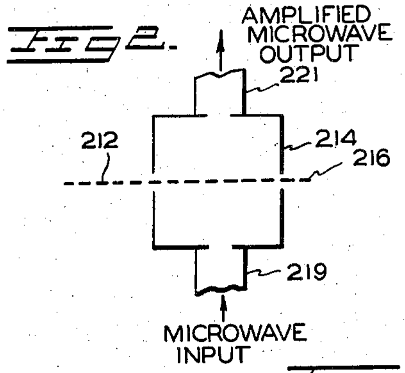
Fig. 2 is a schematic detail of a cavity resonator for use as an amplifier.

Fig. 2 shows in schematic form the manner in which the device may be operated as an amplifier. In this and the following figures of the drawing, the first digit of each reference character is that of the figure, and the remaining digits are the same as in Fig. 1 for corresponding elements. In this case, the cavity 214 is provided with a microwave input 219 for inserting signals and a microwave output 221; both input and output may be wave guides or any other suitable coupling means.

Figure 3:
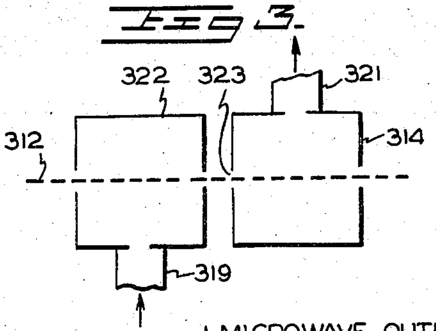
Fig. 3 shows a cavity resonator arrangement of a different type for amplification use.

Another amplifier arrangement which more fully isolates the input from the output is shown in Fig. 3, where two separate cavities are used, both tuned to the same frequency. Beam 312 of excited molecules enters cavity 322 to which microwave energy of suitable frequency is supplied through microwave input 319, to stimulate the excited molecules, which pass through aperture 323 into second cavity 314, where the molecules are now sufficiently stimulated to continue their transitions at a rate sufficient to produce more power at the stimulating frequency which may be withdrawn at microwave output 321.

Before reaching the second cavity 314, the molecules may have already undergone a partial transition from the upper to the lower states, and hence within the second cavity they need not necessarily have a larger probability of existing in the upper state than in the lower state. However, as a result of the stimulating field in the first cavity 322 the relative phases of their oscillations are not random, and hence they are unstable and will radiate appreciable energy into an electromagnetic field in the second cavity 314. This arrangement may be regarded either as an amplifier of electromagnetic waves with an input at the first cavity 322 and an output at the second cavity 314, or as an amplifier or oscillator in which a suitable ensemble of molecules is prepared by the action of the focuser and the radiation in the first cavity so that amplification of a field or oscillations are produced by action of the ensemble in the second cavity.

An important advantage of this type of amplifier is that it is theoretically and practically capable of approaching the theoretical noise limit. The only irrelevant source of stimulated radiation is the microwave field of thermal origin, which may be minimized by lowering the temperature of the cavity considerably below room temperature to reduce the thermal radiation $k$T and obtain "noise figures" which are less than unity.

The above described type of amplifier has a band width determined by the molecular response and by the geometry of the cavity, and a center frequency determined primarily by the molecule. However, this central frequency can be varied by applying electric or magnetic fields. If atoms are used, e.g., $Na^{23}$, the frequency can be widely tuned by a magnetic field applied externally. Wide tuning by means of a magnetic field would also be characteristic of amplifier systems using nuclei, or electrons in paramagnetic or ferromagnetic materials.

Figure 4:
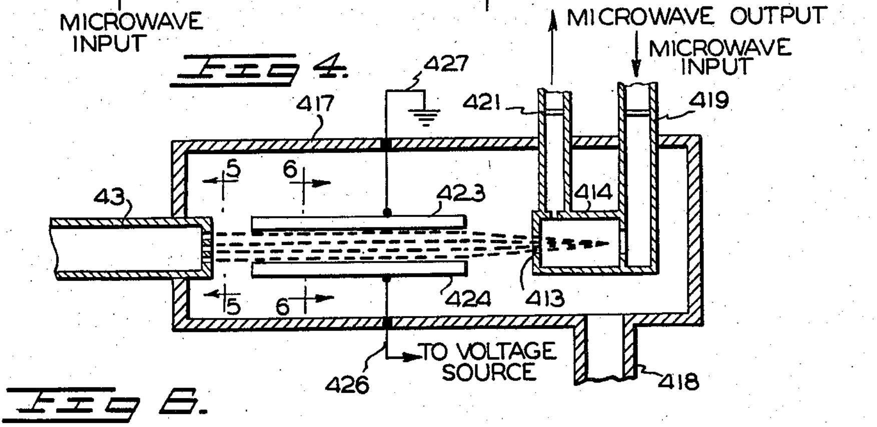
Fig. 4 is a schematic view, partly in section, of the invention used as an amplifier or oscillator, showing one type of molecule focusing arrangement used in practice.
Figure 6:
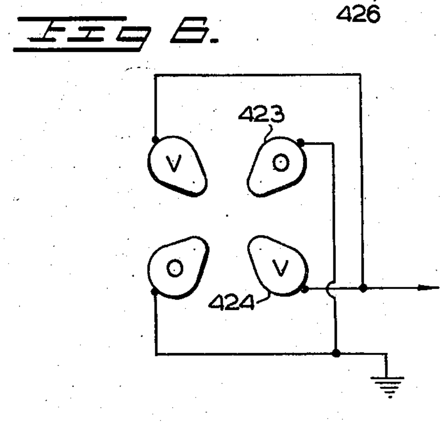
Fig. 6 is a sectional view taken on line 6—6 of Fig. 4.
Figure 5:
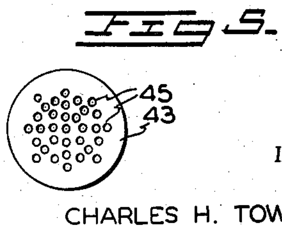
Fig. 5 is a section taken on line 5—5 of Fig. 4.

Figs. 4–6 show in schematic form the essentials of a practical embodiment of the invention as an amplifier, using ammonia gas. The gas is fed from a suitable source at low pressure (approximately $10^{-3}$ mm. Hg) through apertures 45 into chamber 417, which is kept evacuated at 418 by any suitable vacuum pump to a pressure of approximately $10^{-4}$ mm. Hg. The beam of molecules enters the system of focusing electrodes 423, 424, between which a high voltage electric field is maintained by a suitable external source through leads 426, 427. Electrodes 423, 424 may be, for example, about 2 cm. in diameter and about 20 cm. in length. The minimum interelectrode spacing may be about 4 mm. with an interelectrode potential of about 20 to 30 kv. The electrodes are advantageously of the cross-sectional shape shown in Fig. 6, to produce a concentrated axially extending quadrupolar cylindrical electrostatic field in the direction of the beam.

It is also advantagesous to cool the electrodes to a low temperature by circulating a refrigerant medium, such as liquid air, through them to condense the molecules of low energy and other extraneous molecules and thus reduce the probability of collisions in the beam path.

Other electrode arrangements may be used, for example, a large number, for example, eight, cylindrical electrodes at alternate high and low potentials positioned in a circle about the periphery of the beam path. Magnetic fields may also be used to separate the oscillating particles, for example, by arranging a plurality of magnetic pole pieces of alternate polarity about the periphery of the beam path.

Instead of a single beam as illustrated in the drawing, two or more focussed beams of particles in non-equilibrium energy states may be introduced into the resonant cavity. This provides a larger supply of particles into the cavity and tends to neutralize any frequency shift associated with unidirectional motion of the beam.

When using substances of relatively low vapor pressure such as thallium fluoride, for example, a beam of the substance may be vaporized in a heated zone, and the focussing zone may also be heated to prevent accumulation of thallium fluoride therein.

In the focussing chamber there is established by the electrode arrangements described a cylindrical potential distribution in the region between the electrodes in which the electric field is proportional to the radius. The energy of a particle in the focusser in an upper inversion state increases with the radius while that of a particle in a lower inversion state decreases with the radius so that a radially inward or focussing force is exerted on upper inversion state molecules, while a radially outward force is exerted on lower inversion state molecules.

The upper states are thus concentrated into a fairly tight axially extending beam 412 of excited molecules directed toward the aperture 413 of cavity 414.

A typical cavity for use with an $NH_3$ beam may be a circular cylinder with a diameter of about 0.6 inch and a length of about five inches. The cavity can be tuned by varying its length by means of a sliding end section. The aperture 413 for entry of the beam may be about 0.4 inch in diameter.

Transitions are induced in the cavity as previously described, resulting in a change in the cavity power level when the beam of molecules is present. Power of varying frequency is transmitted to the cavity through input waveguide 419 and an emission line is seen at output guide 421 when the transmitted frequency goes through the molecular transition frequency. If the power emitted from the beam is sufficient to maintain the field strength in the cavity at a sufficiently high level to induce transitions in the following molecules of the beam, then self-sustained oscillations will result and the device can be used as an oscillator. Mica windows 419, 421, in the respective waveguides keep the system vacuum-tight but permit passage of microwave energy.

When operated as an oscillator, the invention provides a frequency standard or "clock" of extraordinary accuracy. If the cavity is tuned so that the absorption line falls at its maximum response, then the oscillation frequency is affected by the cavity only by a very small extent. If the cavity frequency changes in an amount $\Delta\nu$, the change in frequency of oscillation is approximately $$\approx \Delta\nu \frac{Q_c}{Q_L}$$

where $Q_c$ is the Q of the cavity and $Q_L$ is that of the line, which corresponds to about $\Delta\nu \times 10^{-3}$. Hence if the cavity is constant to $10^{-7}$, variation of oscillation is only $10^{-10}$. In practice, by checking two oscillators against each other, it appears that, considered as a "clock," a relative change at least as small as one second in 300 years is obtainable.

While the invention has been particularly described with reference to $NH_3$ molecules, it will be apparent that many other oscillating systems can be used, e.g., atoms, electrons or groups of electrons in paramagnetic or ferromagnetic media, nuclei, and other molecules. To be favorable as a source of radiation, an oscillator should have a large electric or magnetic dipole moment and an intense absorption line of appropriate frequency. Among the molecules suitable for this purpose would be $ND_3$, alkali metal halides and thallium halides.

In the case of paramagnetic materials, the magnetic moments of one or several electrons associated with a single atom may be of importance, and there may be one or more resonance frequencies in the range of interest, each of which can be varied by means of a magnetic field. Where several electrons associated with a single atom are involved, they are usually so strongly coupled together that the resonant motions produce synchronous motions of these several electrons and the several electrons may then be considered a single oscillating system. When the population of energy levels is discussed in the sense used in the present sense, energy levels of the entire oscillating system, which may include several coupled electrons, must be understood. This case of several appropriately coupled electrons is of some importance because the magnetic moments of the coupled several electrons may add and produce an oscillator with an effectively larger and hence more favorable magnetic moment.

Ferromagnetic or antiferromagnetic materials represent an extreme case of coupled electron magnetic moments, since in them a very large number of electron spins or magnetic moments are coupled together in such a way that resonant oscillations with very large effective magnetic moments may be obtained. Thus electrons in an entire ferromagnetic domain are so strongly coupled together that typically they are all parallel and act in unison, so that the resonantly oscillating system comprises the entire group. The simplest energy levels for such a system placed in a magnetic field are a very large number of equally spaced levels separated by an energy of approximately $\mu_0 H$, where $\mu_0$ is the Bohr magneton. If the system is excited to any level above the lowest, it may give up energy and hence provide amplification or oscillations by transitions to one of the lower levels, or by successive transitions to each succeeding lower level. Still other types of useful energy levels exist in ferromagnetic or antiferromagnetic materials in which many electrons are coupled together, but all electrons do not remain completely parallel. In any case, ferromagnetic or antiferromagnetic material affords the advantage of a rather large effective magnetic moment, and hence an intense absorption line.

The proportion of particles in high energy states may for some purposes advantageously be increased by various means, for example, by optical excitation at resonant frequencies, or by the application of radio frequency or microwave excitation to produce spin orientation.

A wide variety of cases occur where optical excitation may be used to produce a non-equilibrium distribution of oscillating systems and hence the possibility of amplification or oscillation. For example, an atom may have levels designated in order of increasing energy by 1, 2, and 3, where 1 and 2 are separated by an energy $h\nu_{12}$ and $\nu_{12}$ lies in the radio frequency or microwave range, while 1 and 3 are separated by an appreciably larger energy $h\nu_{13}$. For example, $\nu_{13}$ may be an optical frequency. Now if such atoms are subjected to radiation of frequency $\nu_{13}$, a number of them will make transitions from state 1 to state 3. Assuming that state 3 is appreciably less populated than state 1, as would normally be the case, the radiation will produce appreciably fewer transitions from state 3 to state 1, and there will be a tendency to depopulate the state 1. If this depopulation is sufficiently large that state 1 contains fewer atoms than does state 2, the amplifying action described above may occur. The resulting population of states 1 and 2 will, of course, depend not only on the excitation of atoms from state 1 to state 3, but also on the rate of decay of the excited atoms from state 3 again to state 1 or to state 2.

In some cases it is advantageous to use radiation having a particular polarization, since even though this radiation may contain frequencies necessary to excite atoms from both states 1 and 2, a particular polarization may preferentially excite atoms from state 1, or excite them to higher states which preferentially decay to level 2, thus giving an abnormal and favorable distribution of atoms between states 1 and 2.

Favorable non-equilibrium distribution of oscillating systems may also be produced in paramagnetic materials by application of radiofrequency or microwave excitation. Paramagnetic materials provide favorable properties for very sensitive amplifiers of the type described here since their resonant frequencies are easily varied by means of a magnetic field, and since their characteristics normally give resonances which are as wide as a few megacycles. They would hence allow tunable amplifiers of fairly wide band-width, and in addition can produce somewhat more power than does the apparatus using an ammonia beam which is described above.

Figure 7:
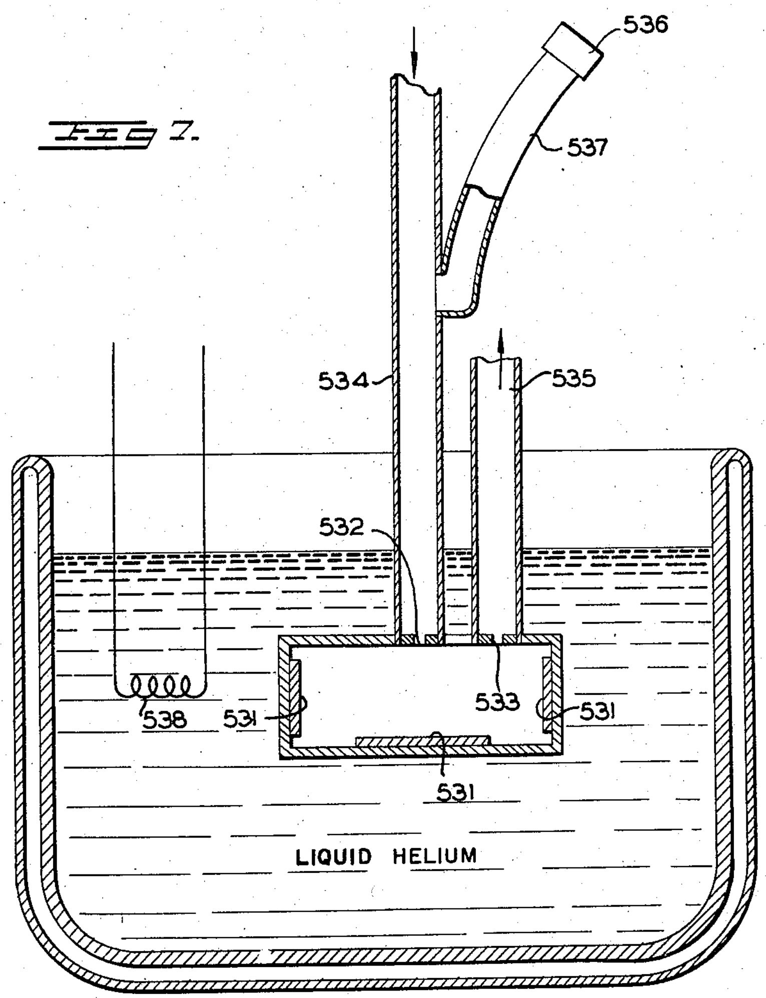
Fig. 7 is a schematic view partly in section of an embodiment of the invention employing solid paramagnetic material.

Crystalline silicon with impurities of phosphorus provides one suitable paramagnetic material. At temperatures of the order of from 1° K. to 4° K., and with a density of P impurities of about $10^{17}$ per cc. or less, the P provides paramagnetic atoms with two resonant frequencies differing by a few hundred megacycles and located in the order of 9000 mc./sec. when the Si is subjected to a magnetic field in the order of 3000 oersteds. Consider now only one of these resonances, which involves a transition between two states corresponding respectively to the unpaired electron on the P being aligned parallel or antiparallel to the magnetic field. Normalyly, there are more P atoms in the lower of these two states. However, several means are available for reversing the populations of the two states, and thus obtaining a larger population in the upper state and the possibility of amplification. It is known that, once such an abnormal distribution is produced, it will slowly revert to a normal distribution by relaxation processes, but that a time of 5 to 30 seconds is required for such relaxation. Hence appreciable amplification may be obtained during times of the order 5 to 30 seconds after the favorable non-equilibrium situation is created. Figure 7 indicates schematically such a system.

The system comprises a high Q cavity 530 resonant at a frequency approximately 9000 mc./sec. corresponding to the resonance of paramagnetic material 531 which may be adhered to the inner sides of the cavity 530. The cavity 530 oscillates in a $TE_{011}$ mode, with the electric field perpendicular to the plane of the figure and parallel to the applied magnetic field. The paramagnetic material should be sufficiently pure or of such composition that electromagnetic losses other than those due to the paramagnetic atoms, for example, of P in Si are very small. The thin slabs 531 of Si are attached to the walls of the cavity as shown in Figure 7 where the microwave magnetic field is large, but the electric field is small. There are input and output coupling holes 532 and 533, respectively, for the cavity 530, with attached input and output waveguides 534 and 535, respectively. A klystron tube 536 is coupled to the input waveguide 534 by a microwave coupler 537 and is operative to supply microwave energy to the cavity 530. The entire cavity 530 is immersed in liquid helium in order to assure the above-mentioned long relaxation time, and in order to increase the ratio of population of the upper and lower states.

The electron spins may be reversed, that is the population of the two states may be interchanged, by a variety of techniques. This may be achieved by suddenly reversing the applied magnetic field. It may also be achieved by a suitable sudden pulse of microwave energy which is of just the proper intensity and duration to produce a single transition between the two states for every electron. A more suitable method is the technique of "adiabatic fast passage." To reverse the electron spins by adiabatic fast passage, microwave energy from a klystron is fed into the cavity as indicated in Fig. 7. The magnetic field is increased until the resonance frequency of the paramagnetic electrons is well above the frequency of the klystron. The field is then rapidly decreased until the resonance frequency is well below the klystron frequency. For a suitable large amount of power from the klystron and a suitably rapid variation of the magnetic field, the direction of each paramagnetic electron will then have been reversed as the result of an induced transition, and the larger population of electrons will be in the upper state. In order to assure that during the adiabatic fast passage the electrons do not produce a spontaneous oscillation by the process of stimulated emission discussed above, the magnetic field may be made inhomogeneous by passage of an electric current through an auxiliary coil 538 shown in Figure 7.

To obtain amplification by stimulated emission, the oscillations of the klystron 536 are stopped, the current in the auxiliary coil 538 interrupted, and the magnetic field retuned to such a value that the paramagnetic resonance is very near the resonant frequency of the cavity 530. These operations must be carried out in a time shorter than the relaxation time of approximately 10 seconds. If the microwave losses in the cavity 530 are sufficiently low and if a sufficiently large number of paramagnetic electrons are present, amplification or oscillation will occur. The cavity Q may, for example, be in the order of 15,000 and the number of paramagnetic phosphorous atoms near $2 \times 10^{17}$. The desired effects may be enhanced by using Si with a concentration of the isotope $Si^{29}$ lower than normal, since this will decrease the hyperfine interactions, hence decrease the width of the paramagnetic resonance, and result in a larger number of paramagnetic atoms which respond to a particular frequency.

Favorable conditions may also be obtained by allowing the magnetic field to remain at a large value (>10,000 oersteds) for a time longer than the relaxation time immediately before producing adiabatic fast passage. This results in a greater preponderance of electrons in the low energy state immediately before the adiabatic fast passage, and hence a greater preponderance in the upper state immediately afterward.

The paramagnetic amplifier described above would not operate continuously over a long time, since the klystron 536 must be periodically brought again into use to renew the population of spins in the upper state. Continuous operation during a long time may be achieved in a similar device by rotating a disc or ring of Si so that it passes first through one cavity where the electron spins are suitably reversed by adiabatic fast passage techniques, and then through a second cavity where amplification occurs. The rotation would provide a continuous fresh supply of paramagnetic atoms in the upper state.

Another suitable paramagnetic material is $MnSO_4(NH_4)_2SO_4.6H_2O$. In this case, the Mn is paramagnetic. If this material contains a non-paramagnetic ion which replaces all but a fraction of one percent of the Mn, then the remaining Mn ions produce suitable paramagnetic resonances at the temperatures of liquid helium. Electrons in this material are thought to relax in a time of the order of one millisecond, so that all of the processes described above should be done with corresponding rapidity.

In the case of molecules existing in, for example, three energy levels, the focusser of the invention may focus the molecules in the highest energy level, defocus the molecules in the intermediate energy level and have little effect on molecules in the lowest energy level. Because of the focussing more molecules in the higher energy level will pass into the cavity than those in the lowest energy level. If the cavity is properly tuned, transition from the highest to the lowest energy level will take place in the cavity producing oscillations or amplification of very high frequency. This form of the invention is particularly useful in producing very short waves.

It will be apparent that the embodiments shown are only exemplary and that various modifications can be made in construction and arrangement within the scope of my invention as defined in the appended claims.

This application is a continuation-in-part of my application Serial No. 506,533 filed May 6, 1955.

I claim:

1. Apparatus for obtaining electromagnetic energy from an ensemble of oscillating particles normally existing in thermal equilibrium in at least two different discrete energy states and capable of transition between said states with output of energy comprising means for producing an unstable, non-equilibrium distribution of particles in said different energy states capable of radiating electromagnetic energy of a frequency related to the difference in energy between said energy states, an oscillatory electromagnetic circuit having an operating frequency range including the frequency of said electromagnetic energy, means for transferring said radiated energy to said circuit, and means for extracting energy from said circuit.

2. Apparatus for obtaining electromagnetic energy from an ensemble of oscillating particles normally existing in thermal equilibrium in at least two different discrete energy states and capable of transition between said states with output of energy comprising means for producing a continuous supply of said particles in an unstable non-equilibrium distribution between said different energy states capable of radiating electromagnetic energy of a frequency related to the difference in energy between the energy states, an oscillatory electromagnetic circuit having an operating frequency range including the frequency of said electromagnetic energy, means for transferring energy of said particles to continuous electromagnetic oscillations of said circuit, and means for extracting energy from said circuit.

3. Apparatus for obtaining energy from an ensemble of oscillating particles normally existing in thermal equilibrium in at least two different discrete energy states and capable of transition between said states with output of energy comprising means for producing a preponderance of said particles in the higher of said states, an electromagnetic oscillatory circuit having an operating frequency range including the allowed radiation frequency produced by transitions from the higher of said states to the lower, means for transferring energy of transition from said particles to said circuit, and means for extracting energy from said circuit.

4. In combination, means for continuously producing in an ensemble of particles consisting of molecules, atoms, nuclei, electrons or groups of such particles an unstable, non-equilibrium distribution of said particles in at least two different energy states, a circuit having a resonant frequency corresponding to a resonant frequency of the particles in such unstable distribution, means for transferring energy radiated by said ensemble of particles to said circuit, and means for extracting energy from said circuit.

5. In combination, means providing an initial beam of molecules comprising molecules in at least two different discrete energy states, means for deflecting molecules in the lower of said states to produce a residual beam of molecules preponderately in the higher of said two states, means providing a high Q resonator having an orifice in the path of said residual beam whereby molecules of said beam enter said cavity, and means for extracting microwave energy from said cavity.

6. In combination, means for producing an ensemble of molecules in energy equilibrium at two different discrete energy states, means for segregating a preponderance of said molecules in the higher of said two states, a microwave electric tank circuit having a resonant frequency in the range of allowed radiation frequency produced by molecular transitions from said higher state to the lower of said two states, means for transferring energy of transition from said molecules to said tank circuit, and means for extracting microwave energy from said tank circuit.

7. The invention according to claim 6, wherein said means for segregating comprises a focusing array of electrostatic field electrodes and means for establishing an electrostatic field between said electrodes of sufficient intensity to concentrate molecules in the higher of said two states into a tight beam and to deflect molecules in the lower of said states from said beam.

8. The invention according to claim 7, said tank circuit comprising a cavity resonator having an aperture aligned with said beam, and electric circuit means coupled to said cavity resonator.

9. The invention according to claim 8, said means for producing an ensemble of molecules comprising a container of said molecules at low pressure, a vacuum-tight housing comprising at least a part of said container, said electrodes, and said cavity resonator, means for maintaining a vacuum in said housing, and aperture means in said container for directing gas therefrom into said housing between said electrodes.

10. In combination, paramagnetic means providing an ensemble of molecules in energy equilibrium at two different energy states, means for effecting a preponderance of molecules in the higher of said two states, a resonant cavity for said paramagnetic means and having a resonant frequency corresponding to the resonant frequency of said paramagnetic means, means for energizing said cavity, and means for extracting energy from said cavity.

References Cited in the file of this patent

UNITED STATES PATENTS

| | | |
|---|---|---|
| 2,670,649 | Robinson | Mar. 2, 1954 |
| 2,743,366 | Hershberger | Apr. 24, 1956 |
| 2,745,014 | Norton | May 8, 1956 |
| 2,749,443 | Dicke et al. | June 5, 1956 |